US006917467B2

(12) United States Patent
Howell et al.

(10) Patent No.: US 6,917,467 B2
(45) Date of Patent: Jul. 12, 2005

(54) OPTICAL AMPLIFIER

(75) Inventors: Thomas Russell Howell, Albuquerque, NM (US); Walter M. Duncan, Dallas, TX (US); Paul L. Rancuret, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 450 days.

(21) Appl. No.: 10/055,096

(22) Filed: Jan. 22, 2002

(65) Prior Publication Data

US 2002/0118443 A1 Aug. 29, 2002

Related U.S. Application Data

(60) Provisional application No. 60/263,150, filed on Jan. 22, 2001, and provisional application No. 60/335,777, filed on Oct. 31, 2001.

(51) Int. Cl.$^7$ ............................................. H01S 3/00
(52) U.S. Cl. ............................. 359/337.13; 359/337.11
(58) Field of Search ..................... 359/337.1, 337.11, 359/337.13

(56) References Cited

U.S. PATENT DOCUMENTS 6,373,622 B1 * 4/2002 Kosaka .................. 359/337.13
6,633,430 B1 * 10/2003 Monnard et al. ...... 359/337.11

\* cited by examiner

*Primary Examiner*—Mark Hellner
(74) *Attorney, Agent, or Firm*—Charles A. Brill; Wade James Brady, III; Frederick J. Telecky, Jr.

(57) ABSTRACT

A programmable amplifier 100 operable to independently adjust the amplification given to various optical signals passing through an optical fiber. An input optical fiber 102 provides a number of optical signals to a demultiplexer which separates each signal carried by the input fiber 102. Each individual wavelength travels to a variable attenuator 106 which lowers the signal strength of each signal based on an input from the system controller 108. The attenuated signals are combined by multiplexer 112 and input to an optical amplifier 114. The optical amplifier 114 receives the combined signal and amplifies each signal in the combined DWDM signal across the entire bandwidth of the amplifier 114. The amplified signals are input to a splitter 116 which removes a small portion of the entire spectrum output by the amplifier 114. The remaining portion of the signal passes to an output fiber 110 and travels to the remainder of the optical network. The small portion of the signal separated by the splitter 116 is input to a spectrum analyzer 118 which detects the signal strength of each component signal traveling through the optical amplifier 100. Signal strength information is passed to the system controller 108. The system controller 108, typically a digital signal processor or programmable microcontroller, uses the information from the spectrum analyzer 118 to control the variable attenuators and the gain of amplifier 114 in order to level the various signals traveling through the amplifier 100.

17 Claims, 1 Drawing Sheet

OPTICAL AMPLIFIER

This application claims priority under 35 USC § 119(e)(1) of provisional application No. 60/263,150 filed Jan. 22, 2001 and provisional application No. 60/335,777 filed Oct. 31, 2001.

FIELD OF THE INVENTION

This invention relates to the field of optical communication systems, particularly to all optical amplifiers for DWDM communication networks.

BACKGROUND OF THE INVENTION

Erbium doped fiber amplifiers (EDFAs) are used to amplify signals passing through an optical fiber. EDFAs rely on a pump laser to excite erbium atoms doping several meters of optical fiber. When a light signal passes through the excited doped fiber, the erbium reverts to its unexcited energy state and gives up the pump energy as a photon of the same wavelength as the light signal triggering the reversion.

EDFAs, unfortunately, have at least two undesirable characteristics. The first undesirable characteristic is that the gain of the EDFA is not flat across the range of wavelengths used in optical communication fibers. This gain skew results in some of the channels of a dense wavelength division multiplexing (DWDM) optical signal receiving more amplification than other signals.

The second undesirable characteristic is that the gain imparted to the various signals in a DWDM optical signal depends on the initial magnitude of the signal—strong signals receive more amplification than weak signals.

The problems caused by these characteristics build up as more EDFAs are used in a signal path. Since EDFA repeaters are used approximately every 60 km, long haul signals are amplified many times. If the gain characteristics are not compensated, the weak signals will be extinguished as the stronger signals consume the amplification power.

Existing systems compensate the signal path to ensure the weak signals are not extinguished. Generally, the path compensation is achieved by placing static filters in the signal path to equalize or set the power of the various channels. Once equalized, the signals may be amplified by a series of EDFAs—as long as the signal do not change power relative to each other. While this enables the use of EDFAs for long haul communication channels, the resulting long haul networks are unable to dynamically respond to the addition or deletion of various signals in the fiber. What is needed is a dynamic equalization method and apparatus.

SUMMARY OF THE INVENTION

Objects and advantages will be obvious, and will in part appear hereinafter and will be accomplished by the present invention which provides an optical amplifier and method. One embodiment of the present invention provides a programmable amplifier comprising: an input fiber emitting a light beam comprised of at least two optical signals; a demultiplexer receiving the light beam and directing the at least two optical signals along separate paths; a variable attenuator on the separate paths receiving the at least two optical signals and attenuating each optical signal; a multiplexer receiving and combining the attenuated optical signals; an optical amplifier receiving and amplifying the combined optical signal; a splitter receiving the amplified combined optical signal and removing a component of the signal; a spectrum analyzer receiving the component of the signal and determining the strength of each said at least two optical signals; and a system controller receiving a measured power level from the spectrum analyzer and providing attenuation control signals to the attenuator. According to one embodiment, a diffraction grating is used as the demultiplexer and multiplexer and a digital micromirror array forms the variable attenuator.

Another embodiment of the present invention provides a method of balancing an optical channel. The method comprises: providing an input light beam comprised of at least two optical signals; directing the at least two optical signals along separate paths; attenuating the at least two optical signals directed along separate paths; combining the attenuated optical signals; amplifying the combined optical signal; removing a component of the amplified combined optical signal; determining the strength of each of the at least two amplified optical signals; and controlling the amplifying based on the determined signal strength. According to one embodiment, a diffraction grating is used to direct the optical signals along separate paths and to combine the attenuated optical signals, and a digital micromirror device is used to attenuate the optical signals.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

There is a great need for an all optical amplifier for use in dense wavelength division multiplexed (DWDM) networks that is capable of providing channel-by-channel variable gain to each signal carried by the DWDM network. Networks will receive many signals from a variety of sources—each potentially having a varying signal strength. For example, some signals may be added to a DWDM fiber by local sources that are known to provide high signal strengths. Other signals are received from distant repeaters or signal sources and may have very low signal strengths. Providing a constant amplification to all of these signals results in an output with unpredictable signal strength and wastes the energy imparted to the portions of the signal that are already strong.

Figure 1:
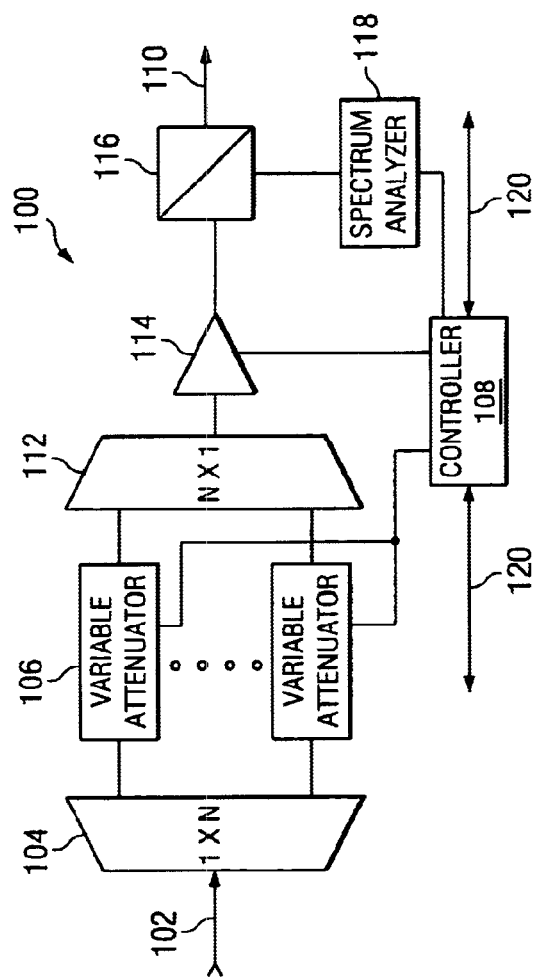
FIG. 1 is a schematic view of an optical amplifier according to one embodiment of the present invention.

The programmable amplifier 100 of FIG. 1 alleviates this problem. In FIG. 1, an input optical fiber 102 provides a number of optical signals to a demultiplexer. The input fiber 102 can carry many signals, each having a different wavelength. The signal strength of each of the optical signals on carried by the fiber 102 varies depending on a multitude of variables including wavelength, strength of other signals in the fiber, distance traveled, initial strength, etc. Furthermore, the number of independent signals carried by the fiber 102 may be unknown.

Demultiplexer 104 separates each signal carried by the input fiber 102. The demultiplexer 104 typically is a diffraction grating or some other device used to spatially separate the various signals based on the wavelength of the signal.

Each individual wavelength travels to a variable attenuator 106. The variable attenuator lowers the signal strength of each signal based on an input from the system controller 108. The attenuation of each signal is intended to level the signal strength of each component signal at either the output 110 of the programmable amplifier 100, or after the output of the amplifier has traveled a distance through an optical fiber. In some applications, level signal strengths may not be desired, but for simplicity the following assumes that the desired signal levels are equal.

The variable attenuators 106 may be formed using a micromirror device. Each component signal is reflected by an array of the micromirrors. Turning various micromirrors to an "off" position—a position that does not transfer incident energy along the transmission path—provides a simple implementation of a variable attenuator function.

The attenuated signals are combined by multiplexer 112. Multiplexer 112 typically is another diffraction grating or another portion of the same diffraction grating forming the demultiplexer 104. The combined signals from the multiplexer 112 are then input to an optical amplifier 114.

The optical amplifier 114 receives the combined signal and amplifies each signal in the combined DWDM signal across the entire bandwidth of the amplifier 114. Typical amplifiers 114 do not have a flat frequency response across their entire bandwidth. In general, the amplifier 114, which is typically an Erbium doped fiber amplifier (EDFA), amplifies longer-wavelength signals more than the shorter-wavelength signals. The gain applied to each signal in the DWDM channel by an EDFA is also dependent on the other channels being amplified. The power applied to the amplifier is divided among the various signals being amplified. As more signals are added to the channel, each signal is amplified less. Likewise, as signals drop out of the channel, each remaining signal is amplified more.

The amplified signals are input to a splitter 116. The splitter 116 may be a partially mirrored interface, a micromirror device, or other means of removing a small component of the signal. The splitter 116 removes a small portion of the entire spectrum output by the amplifier 114. The remaining portion of the signal passes to an output fiber 110 and travels to the remainder of the optical network.

The small portion of the signal separated by the splitter 116 is input to a spectrum analyzer 118. The spectrum analyzer 118 detects the signal strength of each component signal traveling through the optical amplifier 100. The spectrum analyzer 118 may detect the signals in serial or parallel. Signal strength information is passed to the system controller 108.

The system controller 108, typically a digital signal processor or programmable microcontroller, uses the information from the spectrum analyzer 118 to control the variable attenuators and the gain of amplifier 114. By using the feedback signal from the spectrum analyzer 118, the system controller 108 is able to level the various signals traveling through the amplifier 100. While the system controller 108 typically levels the various signals, there may be reasons for raising some of the component signals to a higher strength that other component signals. One reason is that various downstream components may require certain component signals to have a higher intensity. For example, portions of certain components may be split out prior to the next amplifier in the data path. Raising the intensity of these component signals allows sufficient signal strength at the input of the next amplifier.

The signal path between the output of the optical amplifier and then downstream components likely does not have the same response to all of the component signals output by the optical amplifier 100. Even if the path does have a flat response, energy from the shorter wavelength signals often is transferred to longer wavelength signals traveling through the same optical fiber. To counteract this phenomena, the shorter wavelength components may be output at a higher signal strength by the optical amplifier 100 so that they signals will be equalized by the signal path.

The controller 108 may have additional communication paths 120 to allow communication with other controllers upstream or downstream of the controller. The additional communication path may be one or more channels of the DWDM signal 102, 110. Communication between various optical amplifiers or other components in an optical network enables the optical amplifier to tailor its output according to the needs of a particular receiving party and the changing condition of the downstream portions of the optical network.

Placing all of the control functions in a single controller 108, and the use of a minimum number of components, enables the production of a cost effective amplifier with channel-by-channel programmable gain. Furthermore, the integrated nature of the variable attenuators 106 and the amplifier 114 provides consistency and repeatability that cannot easily be achieved using discrete components.

Figure 2:
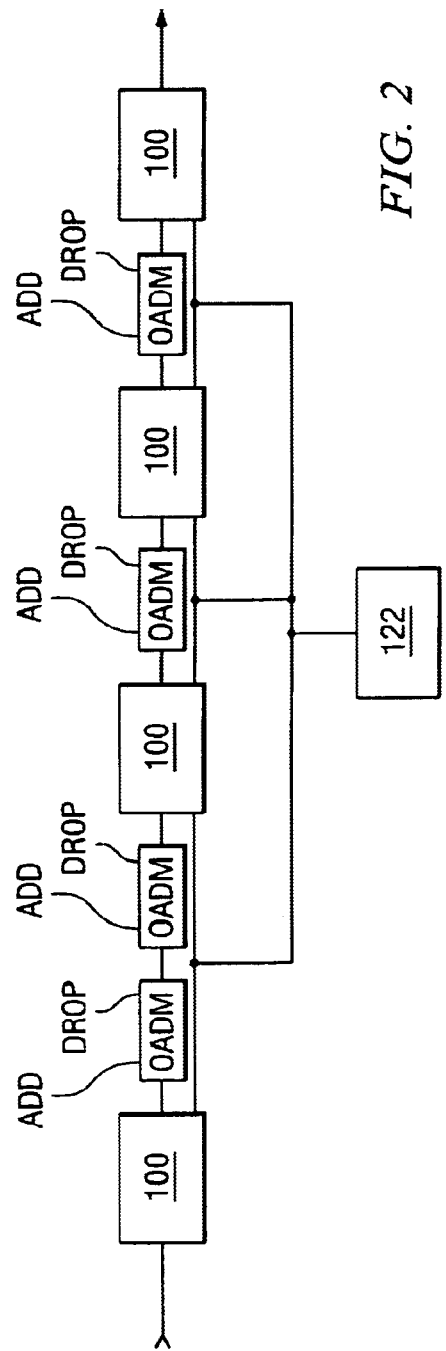
FIG. 2 is a schematic view of one portion of an optical network according to one embodiment of the present invention.

FIG. 2 shows a series of optical amplifiers 100 in a portion of an optical network. Between each amplifier one or more optical add drop multiplexers (OADMs) are shown. Each OADM allows signals to be added or removed from the fiber. Other components, such as optical switches, may be placed between each optical amplifier in addition to or in place of the OADMs shown. A network monitor 122 drives control signals to each optical amplifier to coordinate and monitor the operation of the optical amplifiers 100. Alternatively, one or more optical amplifiers may function autonomously of any network monitor 122. Control signals may be passed between optical amplifiers either by way of separate control lines or by adding such control signals to the optical fiber.

What is claimed is:

1. A programmable amplifier comprising:
   an input fiber emitting a light beam comprised of at least two optical signals;
   a demultiplexer receiving said light beam and directing said at least two optical signals along separate paths;
   a variable attenuator on said separate paths, said variable attenuator comprising a micromirror receiving said at least two optical signals and attenuating each optical signal;
   a multiplexer receiving and combining said attenuated optical signals;
   an optical amplifier receiving and amplifying said combined optical signal;
   a splitter receiving said amplified combined optical signal and removing a component of said signal;
   a spectrum analyzer receiving said component of said signal and determining the strength of each said at least two optical signals; and
   a system controller receiving a measured power level from said spectrum analyzer and providing attenuation control signals to said attenuator.

2. The programmable amplifier of claim 1, said demultiplexer comprising a diffraction grating.

3. The programmable amplifier of claim 1, said multiplexer comprising a diffraction grating.

4. The programmable amplifier of claim 1, said demultiplexer and said multiplexer comprising a single diffraction grating.

5. The programmable amplifier of claim 1, variable attenuator comprising a digital micromirror array.

6. The programmable amplifier of claim 1, said variable attenuator comprising a micromirror array having at least two mirrors for each said optical signal.

7. The programmable amplifier of claim 1, said optical amplifier comprising an erbium doped fiber amplifier.

8. A method of balancing an optical channel, the method comprising:

provided an input light beam comprised of at least two optical signals;

directing said at least two optical signals along separate paths;

attenuating said at least two optical signals directed along separate paths comprising reflecting a portion of said optical signals along said separate paths using a micromirror array;

combining said attenuated optical signals;

amplifying said combined optical signal;

removing a component of said amplified combined optical signal;

determining the strength of each said at least two amplified optical signals; and controlling said amplifying based on said determined signal strength.

9. The method of claim 8, said directing comprising directing said at least two optical signals using a diffraction grating.

10. The method of claim 8, said directing comprising reflecting said at least two optical signals using a diffraction grating.

11. The method of claim 8, said directing comprising passing said at least two optical signals through a diffraction grating.

12. The method of claim 8, said combining comprising combining said at least two optical signals using a diffraction grating.

13. The method of claim 8, said combining comprising reflecting said at least two optical signals using a diffraction grating.

14. The method of claim 8, said combining comprising passing said at least two optical signals through a diffraction grating.

15. The method of claim 8, said attenuating comprising reflecting a portion of said optical signals along said separate paths using a digital micromirror array.

16. The method of claim 8, said attenuating comprising reflecting a portion of said optical signals along said separate paths using a micromirror array having at least two mirrors for each said optical signal.

17. The method of claim 8, said amplifying comprising passing said combined optical signals through an erbium doped fiber amplifier.

* * * * *